United States Patent
Haraguchi et al.

(10) Patent No.: US 9,373,027 B2
(45) Date of Patent: Jun. 21, 2016

(54) OBJECT DETECTION DEVICE

(75) Inventors: Yuki Haraguchi, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 125 days.

(21) Appl. No.: 14/343,182

(22) PCT Filed: Jul. 20, 2012

(86) PCT No.: PCT/JP2012/068440
§ 371 (c)(1),
(2), (4) Date: Mar. 6, 2014

(87) PCT Pub. No.: WO2013/035445
PCT Pub. Date: Mar. 14, 2013

(65) Prior Publication Data
US 2014/0219504 A1  Aug. 7, 2014

(30) Foreign Application Priority Data
Sep. 9, 2011  (JP) .................... 2011-197405

(51) Int. Cl.
*G06K 9/00* (2006.01)
*G06T 7/00* (2006.01)
*G06T 11/60* (2006.01)

(52) U.S. Cl.
CPC ........ *G06K 9/00369* (2013.01); *G06K 9/00805* (2013.01); *G06T 7/0081* (2013.01); *G06T 11/60* (2013.01); *G06T 2210/22* (2013.01)

(58) Field of Classification Search
CPC .......... G06K 9/00369; G06K 9/00791; G06K 9/00805; G06K 9/6215; G06T 7/0081; G06T 2207/20021; G06T 2207/30248; G06T 2207/30252; G06T 2207/30261; B60R 2300/30; B60R 2300/307
See application file for complete search history.

(56) References Cited

U.S. PATENT DOCUMENTS 9,117,111 B2 *  8/2015  Mori et al. ......... G06K 9/00281
382/218
2009/0226037 A1 *  9/2009  Yang et al. ......... G06K 9/00369
382/103
2011/0081089 A1 *  4/2011  Mori et al. .................... 382/218

FOREIGN PATENT DOCUMENTS

JP  2006-293720 A  10/2006  ............... G06T 1/00
JP  2008-021034 A  1/2008  ............... G06T 7/00
(Continued)

OTHER PUBLICATIONS

International Search Report issued Aug. 21, 2012, in PCT/JP2012/068440, filed Jul. 20, 2012.
(Continued)

*Primary Examiner* — Andrew W Johns
(74) *Attorney, Agent, or Firm* — Oblon, McClelland, Maier & Neustadt, L.L.P.

(57) ABSTRACT

It's an object of the invention to provide an object detection device capable of detecting an object for detection in an input image with high precision. In an object detection device 1, a detection window setting unit 11 receives a photographic image 21 photographed by a camera. The detection window setting unit 11 sets a detection window area in the photographic image 21 and generates a normal window image 22 by cutting out the detection window area from the photographic image 21. An image processing unit 12 performs image processing such as enlargement and reduction, etc. on the photographic image 21. Each modified window images 23 is cut out from each of the enlarged photographic image 21 and the reduced photographic image 21. A degree calculation unit 13 calculates matching rates indicating a possibility the object for detection in the window image for each window images on the basis of feature data 51 indicating a feature of the object for detection. A determination unit 14 determines whether or not the detection object is present in the detection window area on the basis of the matching rates of each window image.

7 Claims, 10 Drawing Sheets

(56) References Cited

FOREIGN PATENT DOCUMENTS

| JP | 2009-070344 A | 4/2009 | ................ G06T 7/00 |
| JP | 2010-170201 A | 8/2010 | ................ G06T 7/00 |
| JP | 2011-22994 A | 2/2011 | ................ G06T 7/00 |

OTHER PUBLICATIONS

Bill Triggs, et al., "Object Detection" International Computer Vision Summer School, Jul. 1, 2008, 69 Pages.

Henry Roncancio, et al., "Vision-based System for Pedestrian Recognition using a Tuned SVM Classifier" Engineering Applications (WEA), May 2, 2012, pp. 1-6.

S. Munder, et al., "An Experimental Study on Pedestrian Classification" IEEE Transactions on Pattern Analysis and Machine Intelligence, vol. 28, No. 11, Nov. 1, 2006, pp. 1863-1868.

U.S. Appl. No. 14/656,919, filed Mar. 13, 2015, Haraguchi et al.

U.S. Appl. No. 14/204,676, filed Mar. 11, 2014, Haraguchi, et al.

Office Action issued Dec. 1, 2015 to Japanese Patent Application No. 2011-197405, with English translation.

Office Action issued Mar. 29, 2016 in Japanese Patent Application No. 2011-197405 (with English translation).

\* cited by examiner

COEFFICIENT TABLE 53

| IMAGE PROCESSING | NONE | ENLARGEMENT | REDUCTION | ROTATION |
|---|---|---|---|---|
| WEIGHTING COEFFICIENT | 1.8 | 1.4 | 1.4 | 1.2 |

FIG. 10

| IMAGE PROCESSING<br>DETECTION WINDOW | NONE | ENLARGEMENT | REDUCTION | ROTATION | SUM | RESULT OF FINAL DETERMINATION |
|---|---|---|---|---|---|---|
| DETECTION WINDOW AREA 41 | 1.71(0.95) | 1.05(0.75) | 0.91(0.65) | 0.96(0.80) | 4.63 | PRESENT |
| DETECTION WINDOW AREA 42 | 0.99(0.55) | 1.33(0.95) | 0.63(0.45) | 0.78(0.65) | 3.64 | PRESENT |
| DETECTION WINDOW AREA 43 | 1.08(0.60) | 0.14(0.10) | 0.35(0.25) | 0.42(0.35) | 1.99 | NOT PRESENT |

| DETECTION WINDOW \ IMAGE PROCESSING | NONE | ENLARGEMENT | REDUCTION | ROTATION | RESULT OF FINAL DETERMINATION |
|---|---|---|---|---|---|
| DETECTION WINDOW AREA 41 | PRESENT (0.95) | NOT PRESENT (0.75) | NOT PRESENT (0.65) | NOT PRESENT (0.80) | PRESENT |
| DETECTION WINDOW AREA 42 | NOT PRESENT (0.55) | PRESENT (0.95) | NOT PRESENT (0.45) | NOT PRESENT (0.65) | PRESENT |
| DETECTION WINDOW AREA 43 | NOT PRESENT (0.60) | NOT PRESENT (0.10) | NOT PRESENT (0.25) | NOT PRESENT (0.35) | NOT PRESENT |

FIG. 13

OBJECT DETECTION DEVICE

TECHNICAL FIELD

The present invention relates to an object detection device for determining whether or not an object for detection is present in an image.

BACKGROUND ART

There has been devised an object detection device for determining whether or not an object for detection is present in an image photographed by a camera or the like. An object detection device is mounted onto a vehicle, together with a camera, for example. An object detection device determines whether or not a human is present in an image photographed by a camera, to thereby inform a driver of the presence of the human. With the use of the object detection device, the driver of the vehicle can easily grasp an external situation of the vehicle.

An object detection device employs algorithms of a neural network having a learning function, a support vector machine, and the like, in order to determine whether or not an object for detection is present in an image. An object detection device sets an area where an object is to be detected (detection window area) in an input image. An object detection device then determines whether or not an object for detection is included in an image within the detection window area by using a program in which the above-described algorithm is implemented.

For example, an object detection device according to Patent Document 1 makes a similarity histogram by using an image including a human and an image including an object other than a human, and determines whether or not an object for detection is present in an image within a detection window area with the use of the similarity histogram.

An image recognition apparatus according to Patent Document 2 detects a pedestrian in an image photographed by a vehicle-mounted camera. More specifically, when a potential object which is likely to be a pedestrian is detected in an image by using a neural network, the image recognition apparatus according to Patent Document 2 compares the potential object with a head, arms, legs, and the like which compose a pedestrian, to thereby determine whether or not the potential object is a pedestrian.

An image recognition apparatus according to Patent Document 3 sets a plurality of detection windows respectively including areas for detection which partly overlap with each other, and performs a pattern matching process on each of the detection windows with the use of a standard pattern of an object for recognition (such as a pedestrian). In the image recognition apparatus according to Patent Document 3, if a pattern matching process is performed a plurality of times on one area, respective results of the pattern matching processes for the one area is integrated. Then, based on the result of the integration, the position of a pedestrian is specified.

PRIOR-ART DOCUMENTS

Patent Document 1: Japanese Patent Application Publication No. 2010-170201
Patent Document 2: Japanese Patent Application Publication No. 2008-21034
Patent Document 3: Japanese Patent Application Publication No. 2009-70344

DISCLOSURE OF INVENTION

Problems to be Solved by the Invention

As described above, the conventional apparatuses described in Patent Documents 1, 2, and 3 use characteristic data which indicates a characteristic of an object for detection in determining whether or not an object for detection is present in a search window provided in an image photographed by a camera. For example, in order to determine the presence or absence of an object for detection by using a neural network, the conventional apparatuses learn the characteristic of an object for detection based on a sample image including the object for detection, and then make characteristic data.

However, even if the conventional apparatuses learn with the use of various sample images, an object for detection present within a detection window area cannot be detected in some cases. For example, in a case where an object for detection is too large to fall within the scope of a detection window area, the conventional apparatuses cannot determine that the object for detection is present in the detection window area.

Means for Solving the Problems

An object detection device for detecting an object for detection in an input image, according to the present invention, includes: a detection window setting unit configured to set a detection window area where the object for detection is to be detected, in the input image; an image processing unit configured to generate a normal window image by cutting out the detection window area from the input image, generate a modified input image by carrying out predetermined image processing on the input image, and generate a modified window image by cutting out the detection window area form the modified input image; a degree calculation unit configured to calculate a first degree which indicates a possibility that the object for detection is present in the normal window image and a second degree which indicates a possibility the object for detection is present in the modified window image, based on characteristic data indicating a characteristic of the object for detection; and a determination unit configured to determine whether or not the object for detection is present in the detection window area, based on the first degree and the second degree.

An object detection method for detecting an object for detection in an input image, according to the present invention, includes the steps of: setting a detection window area where the object for detection is to be detected, in the input image; generating a normal window image by cutting out the detection window area from the input image; generating a modified input image by carrying out predetermined image processing on the input image, generating a modified window image by cutting out the detection window area from the modified input image; calculating a first degree which indicates a possibility that the object for detection is present in the normal window image and a second degree which indicates a possibility that the object for detection is present in the modified window image, based on characteristic data indicating a characteristic of the objet for detection; and determining whether or not the object for detection is present in the detection window area, based on the first degree and the second degree.

The above-described object detection device according to the present invention cuts out a normal window image from a detection window area in an input image, and generates a modified window image by carrying out predetermined image processing on the detection window area of the input image. The object detection device calculates a first degree which indicates a possibility that an object for detection is present in the normal window area and a second degree which indicates a possibility that an object for detection is present in the modified window image. Whether or not the object for detection is present in the detection window area is determined based on the first degree and the second degree. Thus, the object detection device generates a plurality of window images from one detection window area, so that whether or not an object for detection is present in a detection window area can be determined with high precision.

An object of the present invention is to provide an object detection device capable of detecting an object for detection in an input image with high precision.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, the preferred embodiments of the present invention will be described with reference to the accompanying drawings.

<First Preferred Embodiment>
<Overall Structure>

Figure 1:
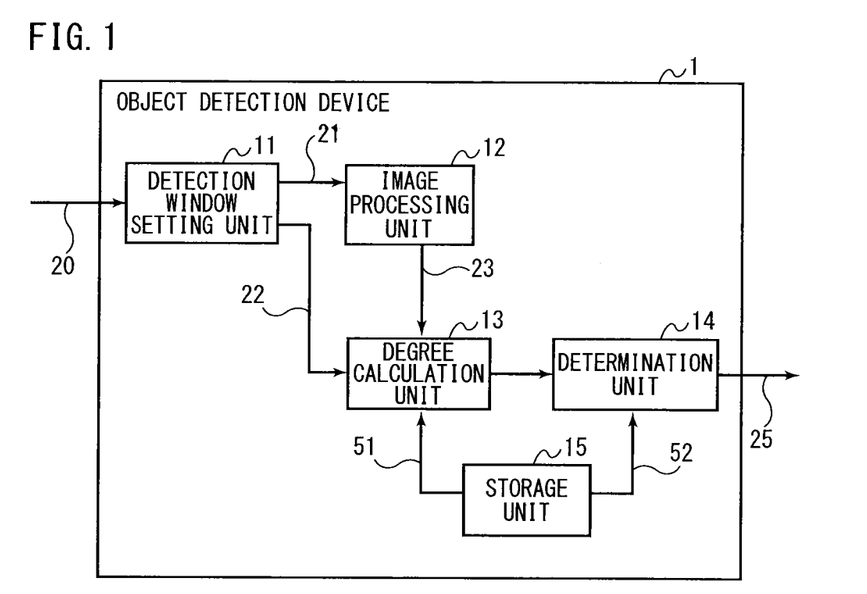
FIG. 1 is a functional block diagram showing a structure of an object detection device according to a first preferred embodiment of the present invention.

FIG. 1 is a functional block diagram of an object detection device 1 according to a first preferred embodiment of the present invention. The object detection device 1 is a device for determining whether or not an object for detection is present in a photographic image photographed by a camera (not shown). The object detection device 1 is mounted onto a vehicle, together with the camera. According to the first preferred embodiment of the present invention, an object for detection is a human (pedestrian). As shown in FIG. 1, the object detection device 1 includes a detection window setting unit 11, an image processing unit 12, a degree calculation unit 13, and a determination unit 14.

The detection window setting unit 11 receives image data 20 from the camera. The image data 20 is an image photographed by the camera, and input on a frame-by-frame basis. The detection window setting unit 11 sets a detection window area in a frame received from the camera (which will be hereinafter referred to as a "photographic image 21"). A detection window area is a unit area for determining whether or not a pedestrian is present in the photographic image 21. An image within a detection window area is cut out from the photographic image 21, so that a normal window image 22 is generated.

The image processing unit 12 carries out image processing having preset contents on the photographic image 21, to thereby generate a modified photographic image. For example, the image processing unit 12 enlarges the photographic image 21 at a predetermined rate. The image processing unit 12 cuts out an image within a detection window area from the enlarged photographic image 21 (i.e., modified photographic image), to thereby generate a modified window image 23. Since the size of the detection window area is not changed when the photographic image 21 is enlarged, the size of the normal window image 22 is identical to the size of the modified window image 23.

It is additionally noted that the number of the modified window images 23 may be either single or plural. In a case where a plurality of modified window images 23, 23, . . . are generated, the image processing unit 12 carries out plural kinds of image processing in accordance with the number of modified window images 23. In a case where three modified window images 23 are generated, the image processing unit 12 performs respective processes for enlargement, reduction, and rotation on the photographic image 21, for example, to thereby generate three modified photographic images. The image processing unit 12 cuts out an image within the detection window area from each of the three modified images, to thereby generate three modified window images 23, 23, . . . which respectively correspond to the respective kinds of image processing.

The degree calculation unit 13 calculates a degree indicating a possibility that a pedestrian is present in each of the normal window image 22 and the modified window image 23 (which will be hereinafter referred to as a "matching rate"), based on characteristic data 51 stored in a storage unit 15. In a case where a plurality of modified window images 23 are generated, the degree calculation unit 13 calculates respective matching rates of the plurality of modified window images. For computation of a matching rate, algorithms of a neural network, a support vector machine, and the like, are employed, for example. In order to employ the foregoing algorithms, the degree calculation unit 13 needs to extract a characteristic of a pedestrian from an image including the pedestrian and generate the characteristic data 51 beforehand.

The determination unit 14 determines whether or not a pedestrian is present in a detection window area based on a matching rate of the normal window image 22 and a matching rate of the modified window image 23. More specifically, the determination unit 14 multiplies each of a matching rate of the normal window image 22 and a matching rate of the modified window image 23 by a weighting coefficient 52. The weighting coefficient 52 is set to the same value irrespective of a position of a detection window area, for each of the normal window image 22 and the modified window image 23. In a case where a plurality of modified window images 23 are generated, the weighting coefficient 52 is set in accordance with each of plural kinds of image processing which are respectively carried out in order to generate the plurality of modified window images 23. The determination unit 14 determines whether or not a pedestrian is present in the detection window area based on a value obtained by summing up respective results of multiplications performed for the window images. A result of determination is output from the determination unit 14, as result data 25.

The storage unit 15 is a hard-disk drive or a flash storage unit, for example. In the storage unit 15, the characteristic data 51 and the weighting coefficients 52 respectively associated with window images are stored.

<Operations of Object Detection Device 1>

Figure 2:
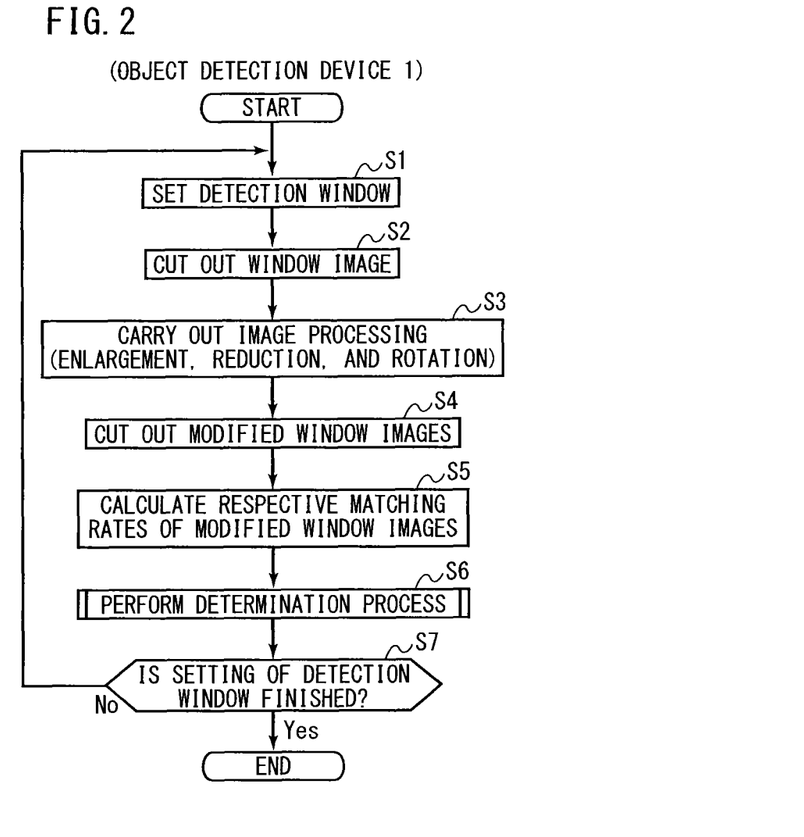
FIG. 2 is a flow chart showing operations of the object detection device shown in FIG. 1.

Below, the operations of the object detection device 1 will be described, taking a case where three kinds of modified window images are generated, as an example. FIG. 2 is a flow chart showing the operations of the object detection device 1. The object detection device 1 performs processes shown in FIG. 2 every time a frame (photographic image 21) is input from the camera.

The detection window setting unit 11 sets one detection window area in the photographic image 21 (step S1). The detection window area is set so as to cause the photographic image 21 to be scanned from an upper-left to a lower-right thereof. It is preferable that the detection window area partly overlaps the other detection window area. This allows thorough detection of a pedestrian when the pedestrian is present in the photographic image 21.

Figure 3:
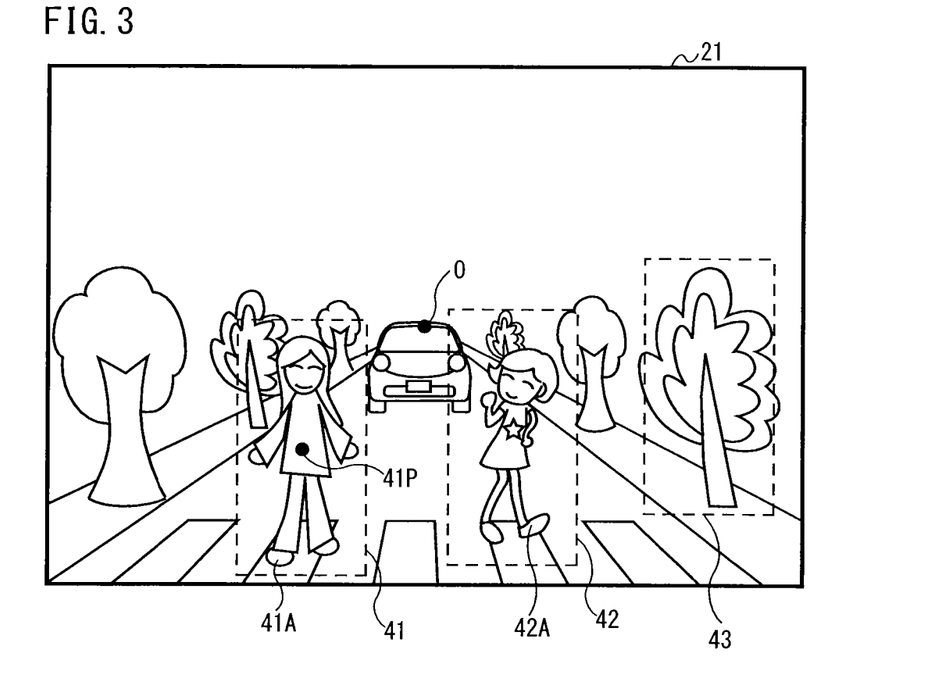
FIG. 3 shows an example of a photographic image input to the object detection device shown in FIG. 1.

FIG. 3 shows an example of the photographic image 21. Since a length of a pedestrian is longer than a breadth of that, each of detection window areas 41, 42, and 43 is a rectangle in portrait orientation. Below, unless special explanation is provided, the operations of the object detection device 1 will be described, taking a case where a detection window area 41 is set in the step S1, as an example.

Figure 4:
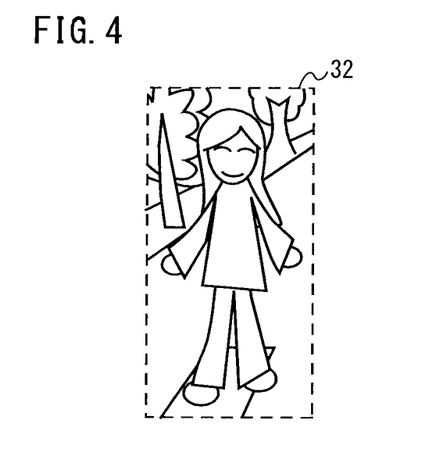
FIG. 4 shows a window image cut out from the photographic image shown in FIG. 3.

FIG. 4 shows a window image cut out from the photographic image 21 shown in FIG. 3. The detection window setting unit 11 cuts out the detection window area 41 from the photographic image 21, to provide the thus cut image as the normal window image 32 (step S2).

Figure 5:
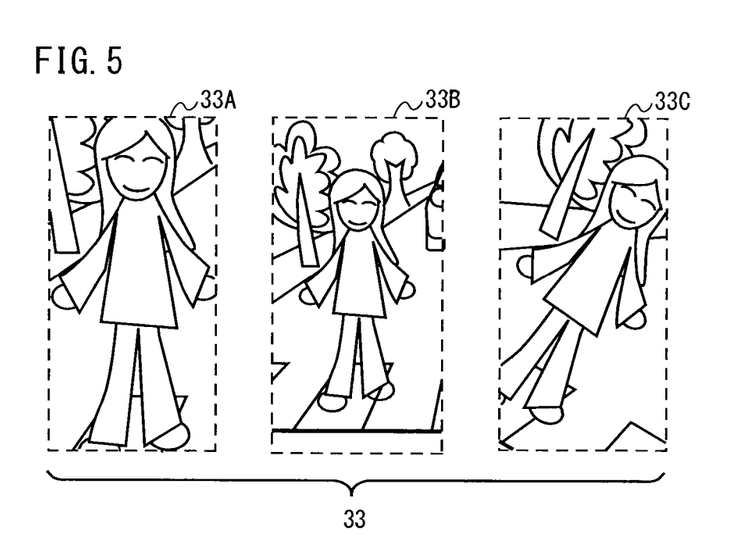
FIG. 5 shows modified window images generated from the photographic image shown in FIG. 3.

FIG. 5 shows examples of modified window images generated by the image processing unit 12. The image processing unit 12 carries out image processing for enlargement, reduction, and rotation on the photographic image 21 (step S3). The image processing unit 12 cuts out an enlarged window image 33A, a reduced window image 33B, and a rotated window image 33C from the respective photographic images 21 which are enlarged, reduced, and rotated, respectively (step S4). Hereinafter, the enlarged window image 33A, the reduced window image 33B, and the rotated window image 33C will collectively be referred to as "modified window images 33".

More specific description about the processes of the steps S3 and S4 will be provided. The image processing unit 12 has specified and knows a position of each pixel of the photographic image 21 and a position of the detection window area 41 with the use of absolute coordinates having an original point corresponding with a center O of the photographic image 21. In generating the rotated window image 33C, the image processing unit 12 rotates each pixel of the photographic image 21 30° in a rightward direction about a point 41P which corresponds with a center of the detection window area 41. The image processing unit 12 does not rotate coordinates of each of vertexes of the detection window area 41 though the position of each pixel of the photographic image 21 on which a process for rotation has been performed is changed. As a result of this, an area which is cut out as the rotated window image 33C is different from an area which is cut out as the normal window image 32, as shown in FIGS. 4 and 5.

In generating the enlarged window image 33A, the image processing unit 12 performs a process for enlargement of the photographic image 21 by using the point 41P as a center. The image processing unit 12 cuts out an image in the detection window area 41 from the enlarged photographic image 21, to thereby generate the enlarged window image 33A. In generating the reduced window image 33B, the image processing unit 12 performs a process for reduction of the photographic image 21 by using the point 41P as a center. The image processing unit 12 cuts out an image in the detection window area 41 from the reduced photographic image 21, to thereby generate the reduced window image 33B. As a result, an area which is cut out as the enlarged window image 33A is smaller than the detection window area 41 as shown in FIGS. 4 and 5. Conversely, an area which is cut out as the reduced window image 33B is larger than the detection window area 41. Additionally, the image processing unit 12 can generate the modified window images 33 by performing processes for enlargement, reduction and rotation on the normal window image 32.

Then, the degree calculation unit 13 calculates a degree indicating a possibility that a pedestrian is present in each of the window images (matching rate) (step S5). A matching rate is calculated by carrying out neural network processing on each of window images. In the first preferred embodiment of the present invention, a matching rate is a numerical value which is from zero to one inclusive. A matching rate approaches one as a possibility of the presence of a pedestrian in a window image becomes greater.

The degree calculation unit 13 needs to generate the characteristic data 51 beforehand in order to calculate a matching rate with the use of a neural network. Now, description about generation of the characteristic data 51 will be given.

Figure 6:
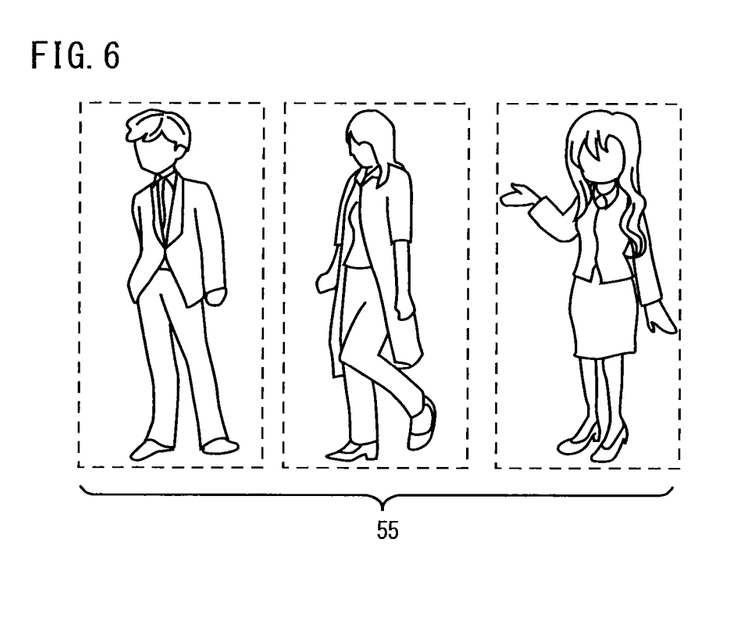
FIG. 6 shows an example of sample image data used in generating characteristic data stored in a storage unit shown in FIG. 1.
Figure 7:
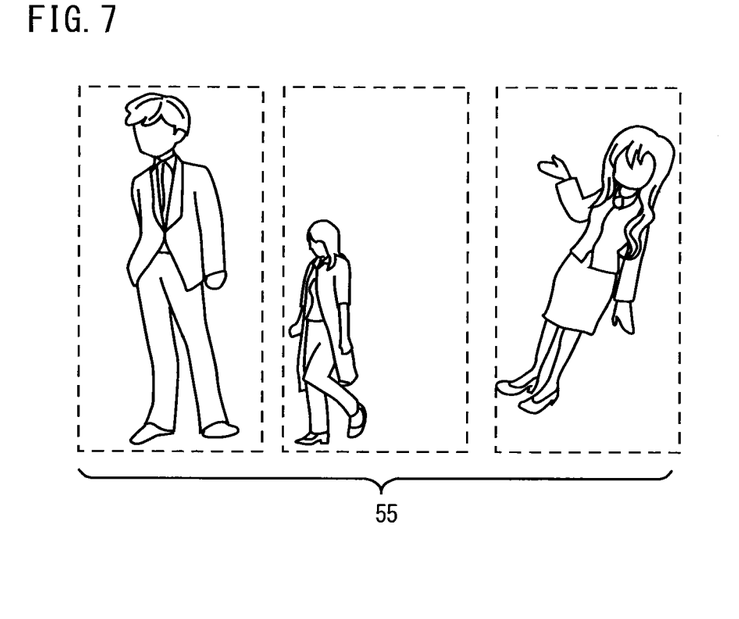
FIG. 7 shows another example of sample image data used in generating characteristic data stored in the storage unit shown in FIG. 1.

Before starting the processes shown in FIG. 2, the rate detection unit 13 receives pieces of sample image data 55, 55, . . . each of which has the same size as the detection window area 41 and includes a pedestrian (person) (refer to FIGS. 6 and 7). Either a group of pieces of normalized image data or a group of pieces of non-normalized image data is input as the sample image data 55. The degree calculation unit 13 learns a pattern of a human in an image having the same size as the detection window area 41, based on the input sample image data 55. The degree calculation unit 13 stores results of learning based on plural pieces of the sample image data 55, 55, . . . , into the storage unit 15, as one piece of the characteristic data 51.

FIG. 6 shows the normalized sample image data 55. Among pieces of the sample image data 55 shown in FIG. 6, the respective sizes of humans, the respective positions of arms, the respective positions of legs, and the like are almost the same. In a case where the characteristic data 51 is generated based on the normalized sample image data 55, it is possible to prevent the degree calculation unit 13 from computing a matching rate close to one for a window image which does not include a human.

FIG. 7 shows the non-normalized sample image data 55. Among pieces of the sample image data 55 shown in FIG. 7, the respective sizes of pedestrians and the respective positions of pedestrians in the images differ. In a case where the characteristic data 51 is generated based on such the sample image data 55 as shown in FIG. 7, the degree calculation unit 13 can calculate a value close to one as a matching rate for the normal window image 32, irrespective of the position and size of a pedestrian within the normal window image 32.

However, it is difficult to perfectly prevent erroneous detection even if the characteristic data 51 is generated with the use of both of the normalized sample image data 55 and the non-normalized sample image data 55. For example, a pedestrian far away from a location of photographing of the photographic image 21 looks smaller when photographed. If the characteristic data 51 based on the normalized sample image data 55 is used, the degree calculation unit 13 cannot calculate a matching rate close to one for a window image including the pedestrian far away. In contrast thereto, in a case where the characteristic data 51 based on the non-normalized sample image data 55 is used, the degree calculation unit 13 can calculate a matching rate close to one for a window image including the pedestrian far away. However, the non-normalized sample image data 55 includes various patterns of humans. For this reason, there is a possibility that the degree calculation unit 13 calculates a matching rate close to one for a window image which does not include a human.

Therefore, if the presence or absence of a pedestrian in the detection window area 41 is determined by using only the normal window image 32, erroneous detection of a pedestrian is caused in some cases, irrespective of whether or not the sample image data 55 is normalized. The object detection device 1 employs matching rates of the modified window images 33 in addition to a matching rate of the normal window image 32, to thereby determine whether or not a pedestrian is present in the detection window area 41, with high precision. The reasons therefore will be provided later.

The determination unit 14 determines whether or not a pedestrian is present in the detection window area 41 based on the respective matching rates of the normal window image 32 and the modified window images 33 (step S6). The details of the step S6 will be provided later.

Subsequently, the detection window setting unit 11 checks whether or not setting of detection window areas in the photographic image 21 is finished (step S7). If setting of detection window areas is not finished ("No" in the step S7), the detection window setting unit 11 returns to the step S1 in order to set a new detection window area. On the other hand, if setting of detection window areas is finished ("Yes" in the step S7), the object detection device 1 terminates the processes shown in FIG. 2. The object detection device 1 again performs the processes shown in FIG. 2 when a new frame (photographic image 21) is received.

<Determination Process (Step S6)>

Figure 8:
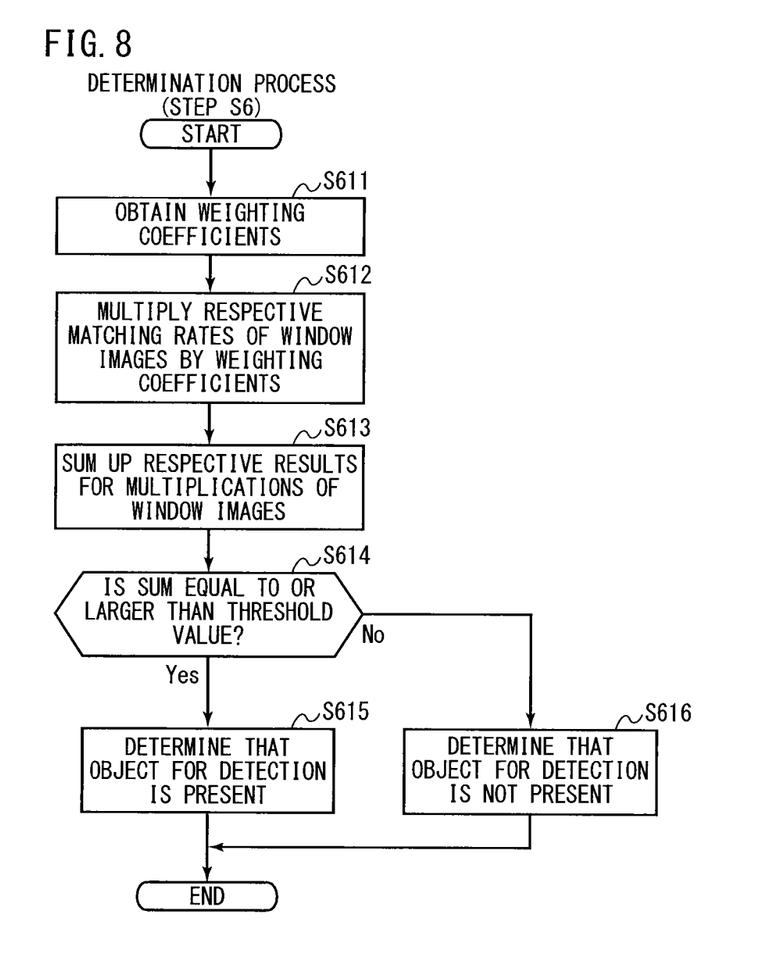
FIG. 8 is a flow chart showing details of a determination process shown in FIG. 2.

Below, details of a determination process (step S6) will be provided. FIG. 8 is a flow chart of the determination process (step S6).

Figure 9:
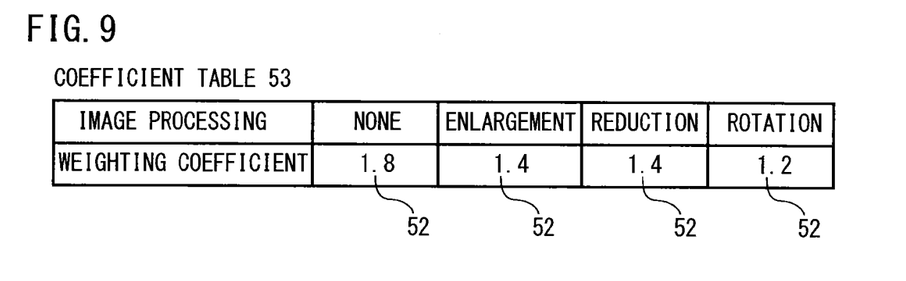
FIG. 9 shows a coefficient table stored in the storage unit shown in FIG. 1.

The determination unit 14 obtains the weighting coefficients 52 from the storage unit 15 (step S611). FIG. 9 shows an example of a coefficient table 53 in which the weighting coefficients 52 are put. As shown in FIG. 9, in the coefficient table 53, the weighting coefficients 52, 52, . . . which are respectively associated with plural kinds of image processing (enlargement, reduction, and rotation) are put. Each of the weighting coefficients 52 is a coefficient by which a matching rate calculated from each of window images is multiplied. The weighting coefficient 52 associated with a window image on which image processing is not carried out (i.e., normal window image 32) is set to 1.8. The weighting coefficients respectively associated with the enlarged window image 33A, the reduced window image 33B, and the rotated window image 33C are set to 1.4, 1.4, and 1.2, respectively. Though the weighting coefficient for a matching rate of the normal window image 32 is the maximum in the example shown in FIG. 9, each of the weighting coefficients may be appropriately changed.

Figure 10:
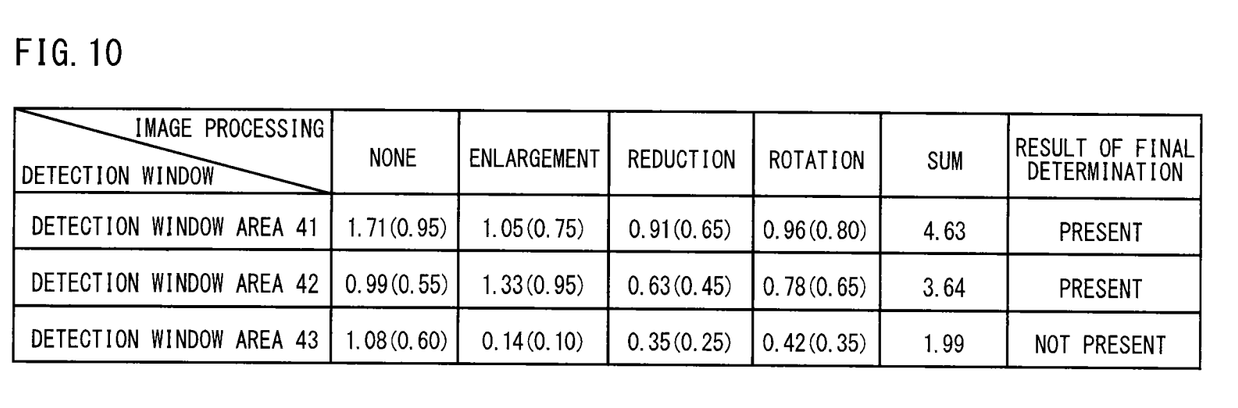
FIG. 10 is a table showing matching rates of window images and modified window images derived from detection window areas shown in FIG. 3 and results of multiplications therefor.

The determination unit 14 multiplies a matching rate of each of window images by an associated weighting coefficient, to provide a result of multiplication (step S612). FIG. 10 shows specific examples of respective matching rates calculated from window images derived from the detection window areas 41, 42, and 43, and respective results of multiplications performed for the window images. A numerical value (un-parenthesized) of each of the window images is a result of multiplication performed for each of the window images. A parenthesized numerical value of each of the window images is a matching rate of each of the window images. The determination unit 14 sums up respective results of multiplications each of which is performed for each of window images derived from the detection window area 41 (step S613). Each of sums shown in FIG. 10 is a sum of results of multiplications performed for respective window images.

The determination unit 14 compares a sum (4.63) resulted from summing up respective results of multiplications performed for the window images with a preset threshold value, in order to determine the presence or absence of a pedestrian in the detection window area 41 (step S614). Now, assume that a preset threshold value held by the determination unit 14 is 3.5. In this assumed case, a sum (4.63) for the detection window area 41 is larger than the preset threshold value ("Yes" in the step S614), so that the determination unit 14 determines that an object for detection (pedestrian) is present in the detection window area 41 (step S615).

On the other hand, if the determination process is performed on the detection window area 43 where no pedestrian is present, it is found that a sum therefor is smaller than the threshold value (3.5) ("No" in the step S614). In this case, the determination unit 14 determines that a pedestrian is not present in the detection window area 43 (step S616).

Next, the reasons why the object detection device 1 can determine whether or not a pedestrian is present in a detection window area with high precision will be provided, taking the detection window area 42 as an example.

Figure 11:
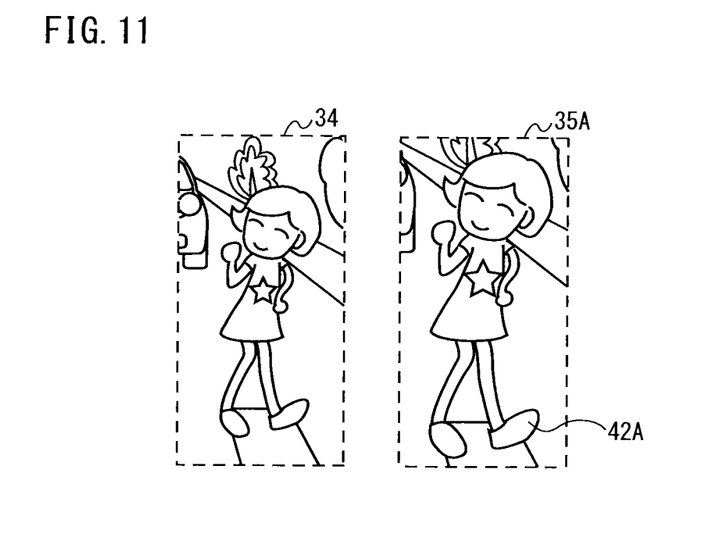
FIG. 11 shows a window image and a modified window image which are derived from a detection window area shown in FIG. 3.

FIG. 11 shows a window image 34 and an enlarged window image 35A each in the detection window area 42. The size of a pedestrian 42A in the enlarged window image 35A is substantially identical to the size of a human in the normalized sample image data 55 (refer to FIG. 6). Thus, it is appreciated that among matching rates regarding the detection window area 42 (refer to FIG. 10), a matching rate of the enlarged window image 35A is the maximum (0.95). On the other hand, in the window image 34, the pedestrian 42A is smaller than the human in the normalized sample image data 55 (refer to FIG. 6). Thus, a matching rate of the window image 34 is an intermediate value (0.55). This means that if the presence or absence of a pedestrian in the detection window area 42 is determined by only using the window image 34, it is possibly determined that a pedestrian is not present in the detection window area 42. Unlike this, the object detection device 1 uses not only the window image 34 but also the enlarged window image 35A in determining whether or not a pedestrian is present in the detection window area 42. This allows high precise determination about presence or absence of a pedestrian in the detection window area 42.

Though not shown in FIG. 3, a pedestrian larger than the detection window area 42 is present in the photographic image 21 in some cases. In such cases, the object detection device 1 cannot calculate a matching rate close to one from a window image. However, there is a possibility that a reduced window image generated by reducing the photographic image 21 includes the whole body of a pedestrian. In such a situation, the object detection device 1 can obtain a matching rate close to one from a reduced window image. Accordingly, even if a pedestrian cannot be detected by using only the window image 34, whether or not a pedestrian is present in a detection window area can be determined with high precision.

Further, in the non-normalized sample image data 55, 55, . . . , patterns of humans are various as shown in FIG. 7. Thus, in a case where computation is achieved by using the characteristic data 51 based on the non-normalized sample image data 55, there is a possibility that a matching rate of a window image including a pedestrian is an intermediate value (approximately 0.4-0.6, for example). In this case, it is difficult to determine whether or not a pedestrian is present by using only one window image. However, since the object detection device 1 uses respective matching rates of a plurality of window images, the object detection device 1 can determine whether or not a pedestrian is present in a detection window area with high precision.

Second Preferred Embodiment

Hereinafter, a second preferred embodiment of the present invention will be described. In the description of the second preferred embodiment, matters different from the first preferred embodiment will be mainly discussed.

According to the second preferred embodiment, contents of the determination process (step S6, refer to FIG. 2) are distinctive. In the determination process (step S6), whether or not a pedestrian is present is determined for each of window images, and whether or not a pedestrian is present in a detection window area is finally determined based on results of the respective determinations about the window images.

Figure 12:
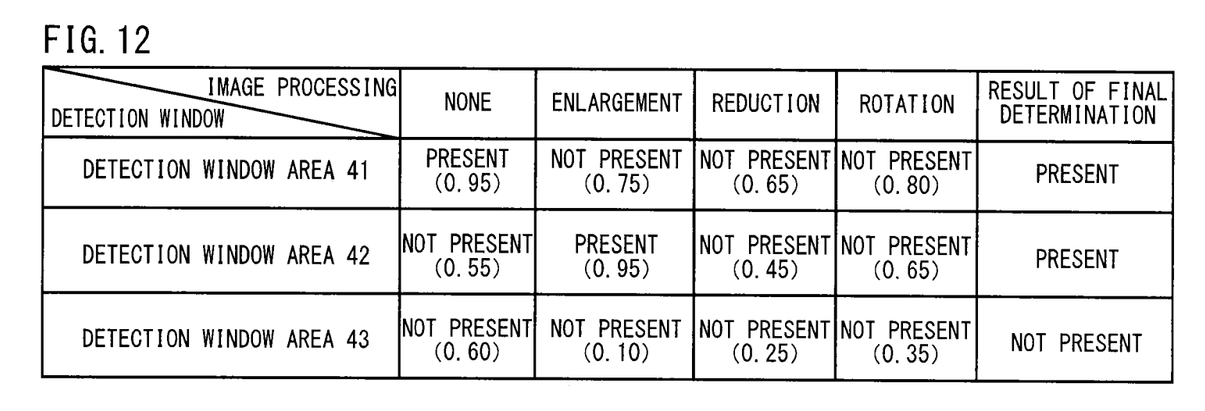
FIG. 12 shows results provided by a determination process performed by an object detection device according to a second preferred embodiment of the present invention.

Below, more details of the second preferred embodiment of the present invention will be given, taking a case where presence or absence of a pedestrian in the detection window area 41 is determined, as an example. FIG. 12 shows respective matching rates of window images and results of respective determinations about detection window areas according to the second preferred embodiment of the present invention. The respective matching rates of the window images shown in FIG. 12 are identical to the values shown in FIG. 10.

The object detection device 1 performs the processes of the steps S1, S2, S3, S4, and S5 shown in FIG. 2, and calculates respective matching rates of the window images (the normal window image 32 and the modified window images 33) derived from the detection window area 41. Then, the determination unit 14 performs small processes shown in FIG. 13, as the determination process (step S6).

Figure 13:
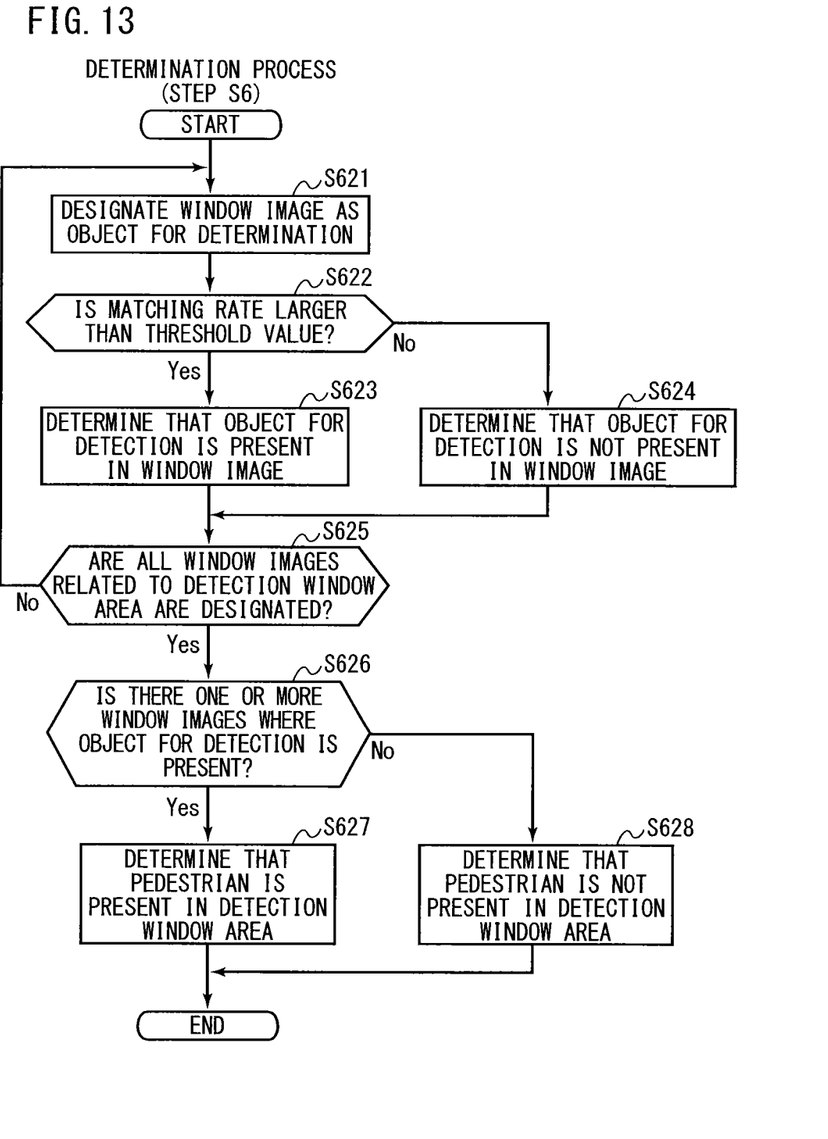
FIG. 13 is a flow chart of the determination process performed by the object detection device according to the second preferred embodiment of the present invention.

FIG. 13 is a flow chart showing contents of the determination process according to the second preferred embodiment of the present invention. Below, description will be made, taking a case where presence or absence of a pedestrian in the detection window area 41 is determined, as an example. The determination unit 14 designates one out of the normal window image 32 and the modified window images 33 as an object for determination (step S621), and determines whether or not a pedestrian is present in the designated window image (step S622). In the determination unit 14, a threshold value for determining whether or not a pedestrian is present for each of window images is previously set. The determination unit 14 compares a matching rate of the designated window image with the threshold value, to thereby determine whether or not a pedestrian is present in each of window images.

Now, consider a case where the threshold value is set to 0.8 and the normal window image 32 is designated as an object for determination. A matching rate (0.95) of the normal window image 32 exceeds the threshold value ("Yes" in the step S622), so that the determination unit 14 determines that a pedestrian is present in the normal window image 32 (step S623).

The determination unit 14 checks whether or not all of window images generated in order to determine the presence or absence of a pedestrian in the detection window area 41 (i.e., the normal window image 32 and the modified window images 33) are designated (step S625). If all of the window images are not designated ("No" in the step S625), the determination unit 14 returns to the process of the step S621. By doing so, the process of the step S622 is performed on each of all of the window images. As shown in FIG. 12, the respective matching rates of the enlarged window image 33A, the reduced window image 33B, and the rotated window image 33C are 0.75, 0.65, and 0.80, respectively, and all of them are equal to or smaller than the threshold value ("No" in the step S622). Thus, the determination unit 14 determines that a pedestrian is not present in any of the enlarged window image 33A, the reduced window image 33B, and the rotated window image 33C (step S624).

If all of the window images are designated ("Yes" in the step S625), the determination unit 14 determines whether or not a pedestrian is present in the detection window area 41 based on the results of the respective determinations about the normal window image 32 and the modified window images 33. More specifically, if it is determined that a pedestrian is present in one or more window images ("Yes" in the step S626), the determination unit 14 determines that a pedestrian is present in the detection window area 41 (step S627). If it is determined that a pedestrian is not present in any of the window images ("No" in the step S626), the determination unit 14 determines that a pedestrian is not present in the detection window area 41 (step S628).

Additionally, in the step S626, the determination unit 14 may use the other criteria in determining whether or not a pedestrian is present in the detection window area 41. For example, the determination unit 14 may determine that a pedestrian is present in the detection window area 41 when it is determined that a pedestrian is present in the majority or more of the window images. Otherwise, the determination unit 14 may determine that a pedestrian is not present in the detection window area 41 when absence of a pedestrian is determined in any one of the window images at all. Also, the determination unit 14 may set a threshold value in accordance with each kind of image processing in the process of step S622. Further, the determination unit 14 may multiply each of the respective matching rates of the normal window image 32 and the modified window images 33 derived from the detection window area 41 by the weighting coefficient 52 in the step S622. In this case, since a result of multiplication may occasionally be equal to or larger than one, a threshold value in accordance with the result of multiplication is set.

As described above, according to the second preferred embodiment of the present invention, the determination unit 14 performs a process of determining whether or not a pedestrian is present for each of window images, and finally determines whether or not a pedestrian is present in a detection window area based on the results of the respective determinations about the window images. The object detection device 1 according to the second preferred embodiment of the present invention can determine whether or not a pedestrian is present in a detection window area without multiplying each of respective matching rates of window images by a weighing coefficient.

In the above-described first and second preferred embodiments of the present invention, the image processing unit 12 may generate a plurality of modified window images 33 having different rates of enlargement in the process of the step S3 (refer to FIG. 2). The determination unit 14 may set the weighting coefficient 52 which varies with each rate of enlargement in performing the determination process (step S6) according to the first preferred embodiment of the present invention. This holds true for cases of reduction and rotation.

In the above-described first and second preferred embodiments of the present invention, enlargement, reduction, and rotation have been cited as examples of kinds of image processing in the step S3. The object detection device 1 may carry out the other various kinds of image processing than the above-cited kinds of image processing. Below, a specific example of image processing which is carried out on the photographic image 21 by the image processing unit 12 will be described.

The image processing unit 12 may provide a white noise to the photographic image 21, to thereby generate a modified window image. Also, the image processing unit 12 may provide various noises such as a Gaussian noise, other than a white noise, to thereby generate the modified window images 23 which are respectively affected by the various kinds of noise. Otherwise, the image processing unit 12 may provide a plurality of noises having various intensities to the photographic image 21, to thereby generate a plurality of modified window images 23 which are respectively affected by the various intensities of noises.

The image processing unit 12 may perform a process of trapezoid correction on the photographic image 21. A process of trapezoid correction is one of processes for changing the size of a photographic image, and a process of changing a rate of reduction (or a rate of enlargement) of the photographic image 21 along a direction of a vertical axis. Also in the process of trapezoid correction, a plurality of modified window images having different change rates of respective rates of reduction may be generated.

The image processing unit 12 may flip the photographic image 21 relative to a vertical axis (or a horizontal axis) passing through a center of the photographic image 21. In other words, the image processing unit 12 may perform a process of flipping the photographic image 21 relative to an arbitrary straight line passing through the photographic image 21.

The image processing unit 12 may carry out image processing for changing a contrast of the photographic image 21. More specifically, the image processing unit 12 transforms a brightness distribution of pixels of the photographic image 21 (histogram), and adjusts an average, a variance, and the like of the pixels. As a result of this, a pedestrian, if any, can be detected with high precision even in an image photographed at night time.

In the above-described first and second preferred embodiments of the present invention, an example in which the object detection device 1 performs a process of detecting a pedestrian in the photographic image 21 photographed by the camera (not shown) in real time has been discussed. However, the object detection device 1 may perform the above-described processes for detection of an object on an image stored in a storage device such as a hard-disk drive.

While the invention has been shown and described in detail, the foregoing description is in all aspects illustrative and not restrictive. It is therefore understood that numerous modifications and variations can be devised without departing from the scope of the invention.

The invention claimed is:

1. An object detection device for detecting an object for detection in an input image, comprising:
   circuitry configured to:
      set a detection window area where the object for detection is to be detected, in the input image;
      generate a first window image by cutting out, from the input image, an image within the set detection window area;
      generate a second window image by carrying out, on the input image, predetermined image processing using a center of the set detection window area as a reference without changing a position of a vertex of the set detection window area and then cutting out the image within the set detection window area from the input image on which the predetermined image processing has been carried out;
      calculate a first degree that indicates a possibility that the object for detection is present in the first window image and a second degree that indicates a possibility that the object for detection is present in the second window image, based on characteristic data indicating a characteristic of the object for detection; and
      determine whether or not the object for detection is present in the set detection window area, based on the first degree and the second degree.

2. The object detection device according to claim 1, wherein the circuitry is further configured to:
   generate a third window image by carrying out, on the input image, image processing different from the predetermined image processing using the center of the set detection window area as a reference and then cutting out an image within the set detection window area from the input image on which the different image processing has been carried out
   calculate a third degree indicating a possibility that the object for detection is present in the third window image; and
   determine whether the object for detection is present within the detection window area of the input image based on the first degree, the second degree and the third degree.

3. The object detection device according to claim 1, wherein the circuitry is further configured to:
   determine whether or not the object for detection is present in the first window image based on the first degree;
   determine whether or not the object for detection is present in the second window image based on the second degree; and
   determine whether or not the object for detection is present in the detection window area based on a result of the determination associated with the first window image and a result of the determination associated with the second window image.

4. The object detection device according to claim 1, wherein the circuitry is further configured to:
   calculate a sum of the first degree and the second degree; and
   determine whether or not the object for detection is present in the detection window area, based on the sum.

5. The object detection device according to claim 4, wherein the circuitry is further configured to:
   sum up a result of multiplication of the first degree by a weighting coefficient set in association with the first window image and a result of multiplication of the second degree by a weighting coefficient set in association with the second window image.

6. The object detection device according to claim 5, wherein the circuitry is further configured to:
generate a third window image by carrying out, on the input image, image processing different from the predetermined image processing using the center of the set detection window area as a reference and then cutting out an image within the set detection window area from the input image on which the different image processing has been carried out calculate a third degree indicating a possibility that the object for detection is present in the third window image;

sum a multiplied value obtained by multiplying the first degree by a weighting coefficient set for the first window image, a multiplied value obtained by multiplying the second degree by a weighting coefficient set for the second window image, and a multiplied value obtained by multiplying the third degree by a weighting coefficient set for the third window image.

7. An object detection method for detecting an object for detection in an input image, comprising:
setting, via circuitry of an object detection device, a detection window area where the object for detection is to be detected, in the input image;

generating, via the circuitry, a first window image by cutting out, from the input image, an image within the set detection window area;

generating, via the circuitry, a second window image by carrying out, on the input image, predetermined image processing using a center of the set detection window area as a reference without changing a position of a vertex of the set detection window area and then cutting out the image within the set detection window area from the input image on which the predetermined image processing has been carried out;

calculating, via the circuitry, a first degree that indicates a possibility that the object for detection is present in the first window image and a second degree that indicates a possibility that the object for detection is present in the second window image, based on characteristic data indicating a characteristic of the objet for detection, the characteristic data including the characteristic of the object for detection extracted from sample image data; and determining, via the circuitry, whether or not the object for detection is present in the set detection window area, based on the first degree and the second degree.

* * * * *